April 15, 1941.  H. S. SHAPIRO  2,238,710
ADJUSTABLE COVER
Filed July 15, 1940

Harry S. Shapiro
INVENTOR.
BY Clarence E. Threedy
HIS ATTORNEY.

Patented Apr. 15, 1941

2,238,710

UNITED STATES PATENT OFFICE 2,238,710

ADJUSTABLE COVER

Harry S. Shapiro, Chicago, Ill.

Application July 15, 1940, Serial No. 345,512

3 Claims. (Cl. 220—25)

This invention has as its principal object the provision of an adjustable cap structure or closure for vents, flues, clean-out openings and the like, provided with internal threading or analogous formations.

More particularly stated, the invention provides a cap structure or closure which may be applied to pipe openings or the like of different size, the improved structure including an attaching member having oppositely diverging arms which are sprung into engagement with internal surface portions of the pipe or opening, together with a closure plate and a securing screw therefor threaded into the attaching member.

Another object of the invention is the provision of an improved attaching member in the nature of a gripper adapted to be inserted in an internally threaded pipe, the gripper including an elongated rod having a central tap into which the securing bolt is to be threaded, and a pair of thread-engaging riders slidably mounted near opposite ends of the rod, together with spring means for urging the riders outwardly into engagement with the threading or analogous surface irregularities in the pipe.

Other objects, advantages and novel aspects of the invention reside in certain details of construction as well as the cooperative relationship of the component parts of the illustrative embodiment described hereinafter in view of the annexed drawing, in which.

Figure 1:
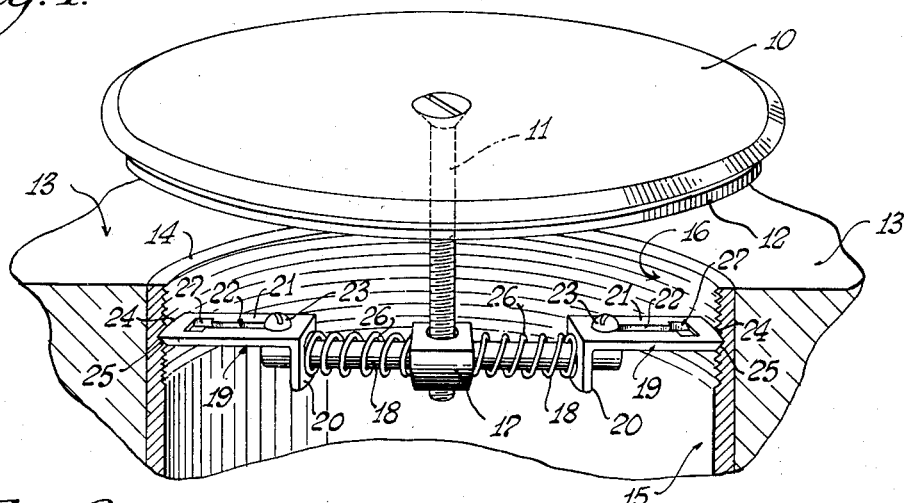
Fig. 1 is a perspective of the cover and manner of applying the same to a clean-out pipe in a floor.
Figure 2:
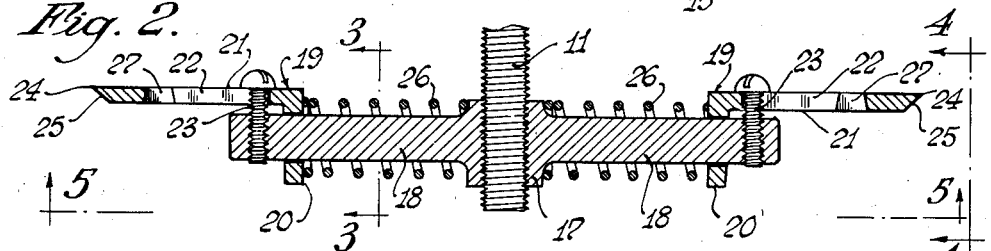
Fig. 2 is a vertical section through the attaching member or gripper.
Figure 3:
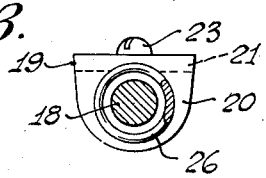
Fig. 3 is a transverse section across the gripper along lines 3—3 of Fig. 2.
Figure 4:
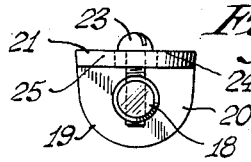
Fig. 4 is an end view of a rider on the gripper looking in the direction of lines 4—4 of Fig. 2.

Referring to Fig. 1, the improved cover structure includes a cover plate 10 preferably of circular configuration and provided with a central opening through which is passed a securing member or bolt 11. A sealing washer or gasket 12 is positioned on the underside of the plate for sealing engagement with the surface portions 13 of a floor or the like surrounding the mouth 14 of an opening or conduit, such as the pipe 15, having an internal irregularity or threading 16.

The attaching member or gripper includes an elongated member having a central body portion 17 from opposite sides of which extend integral arms or rods 18. The elongated body member may preferably be turned out in quantity on a screw machine. Retractable pipe engaging members or grippers are provided in the form of riders 19 each having a vertical flange or wall portion 20 apertured to slide on one of the arms 18, and each further provided with a horizontally extending flange or arm 21 in which is formed an elongated guide slot 22 in which the shank portion of a stop screw 23 projects, the stop screws being threaded laterally into the end portions of each of the rod arms 18.

The outermost ends of each of the horizontal flanges or arms 21 on the riders are curved as at 24 and also beveled as at 25 to fit into an average size of threading 16. Means in the form of coil springs 26 are provided on each of the rod arms 18 to urge the corresponding riders outwardly and project the corresponding thread-engaging end portions 24—25 into engagement with the threads on the pipe.

Figure 5:
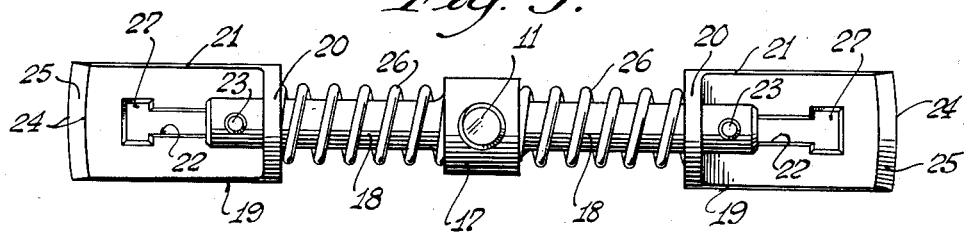
Fig. 5 is a plan view looking up in the direction of lines 5—5 of Fig. 2.

Another important feature of the improved structure is the provision of tool-engaging slots 27 (Fig. 5 particularly) near the outer ends of each rider. In the present embodiment these slots are enlarged laterally at the ends of the guide screw slots 22, their purpose being to receive a tool, such as the head of a screwdriver, for manipulation of the gripper in application or removal.

The riders 19 may preferably be castings, and the central member, including the enlarged portion 17 and the opposite arms 18, may conveniently be turned out in great quantities on a screw machine, it being apparent that the entire device lends itself to economical quantity production, the assembly of the remaining parts, including the springs 26 and the guide screws 23, being easily and expeditiously effected.

The various advantages and objects of the invention may be accomplished by modifications of the particular embodiment specifically described herein, and it is intended that the appended claims shall include all equivalent arrangements fairly coming within their call.

I claim:

1. In a device of the class described, a gripper for insertion in an opening having internal threading, said gripper including an elongated element having a centrally enlarged portion in which there is a transverse tapped bore, opposite projecting arm portions extending from said central enlarged portion, a rider on each arm portion including angularly disposed flange portions, one of which is apertured to slide on one of said arm portions, and the remaining flange portion of each rider extending in the direction of the corresponding arm portion, each of said remaining flange portions being provided with a thread-engaging outer end portion and with a guide slot extending in the direction of sliding movement of the rider, means projecting into the guide slots in each rider from the corresponding arm portion, spring means on said arm portions urging said riders outwardly to project the thread-engaging end portions into engagement with said threading in the pipe, said bore being adapted to receive an attaching screw for a closure for said pipe.

2. In a device of the class described, riders mounted on an elongated member for movement back and forth thereon into and out of supporting engagement with the interior portions of an opening, said elongated member being adapted to engage an attaching member for a closure for said opening, said riders each comprising a flange portion extending in the direction of the length of said elongated member and another flange portion extending at an angle to said first-mentioned flange portion and slidably mounted upon said elongated member for movement as aforesaid, said first-mentioned flange portions each having outer end portions adapted for supporting engagement with the wall portions of the opening as aforesaid, said first-mentioned flange portions further being provided with a tool-receiving slot adapted to receive a manipulating tool for moving the riders back and forth in applying or removing said device, means for urging the riders outwardly of the central portion of said elongated member, and means for limiting said outward movement of the riders.

3. In a device of the class described, a gripper adapted to fit inside a pipe or the like to provide an attaching means for a closure, said gripper comprising an elongated member having a central shoulder, means on said shoulder adapted to engage a cover attaching element, a rider mounted to slide axially of said elongated member on each side of said shoulder, spring means on said elongated member between said shoulder and each rider urging the latter in a direction outwardly of the shoulder, each of said riders being provided with a guide slot extending axially of said elongated member, laterally projecting stop means on said elongated member engaged in said slots in each rider to limit outward movement of the latter to a normal position, each rider being provided with a tool-engaging slot by means of which a manipulating tool may be engaged therewith to effect movement of the riders back and forth in applying or removing the gripper, each of said riders being provided with an engaging portion adapted to supportably engage the interior surface formations of an opening to be closed by the aforesaid closure.

HARRY S. SHAPIRO.